(12) United States Patent
Tomko

(10) Patent No.: US 6,522,993 B1
(45) Date of Patent: Feb. 18, 2003

(54) METHOD AND SYSTEM FOR MARKING SURFACE DEVIATIONS ON A THREE DIMENSIONAL SURFACE

(75) Inventor: Andrew John Tomko, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,524

(22) Filed: Sep. 14, 2001

(51) Int. Cl.[7] .............................................. G01B 7/008
(52) U.S. Cl. ........................ 702/150; 712/152; 700/195
(58) Field of Search ............................ 702/153, 33, 36, 702/94, 95, 115, 150–152, 155–159, 166–168, 170–172; 364/571; 416/228; 156/293; 700/195, 56–62, 64–66, 159, 160; 901/14; 345/419, 427; 392/122; 382/134

(56) References Cited

U.S. PATENT DOCUMENTS

| 4,569,633 | A | * | 2/1986 | Flemming, Jr. ............. 416/228 |
| 5,598,515 | A | | 1/1997 | Shashua |
| 5,724,264 | A | * | 3/1998 | Rosenberg et al. .......... 702/152 |
| 5,821,943 | A | | 10/1998 | Shashua |
| 5,847,974 | A | * | 12/1998 | Mori et al. .................... 702/94 |
| 6,015,473 | A | * | 1/2000 | Rosenberg et al. .......... 156/293 |
| 6,078,876 | A | * | 6/2000 | Rosenberg et al. .......... 702/152 |
| 6,094,198 | A | | 7/2000 | Shashua |
| 6,125,337 | A | * | 9/2000 | Rosenberg et al. .......... 702/153 |
| 6,134,506 | A | * | 10/2000 | Rosenberg et al. ............ 702/95 |
| 6,167,151 | A | | 12/2000 | Albeck et al. |
| 6,201,541 | B1 | | 3/2001 | Shalom et al. |

\* cited by examiner

*Primary Examiner*—John Barlow
*Assistant Examiner*—T Lan
(74) *Attorney, Agent, or Firm*—Hunton & Williams

(57) ABSTRACT

A method is provided for evaluating and marking deviations of a surface of a part from a design standard for the surface. The method comprises determining a point deviation for each of a plurality of points on the surface and determining deviation regions for the surface. Each deviation region includes only surface points having point deviations within a predefined deviation range associated with the deviation region. The method further comprises preparing a graphical representation of the surface illustrating the deviation regions and applying a copy of the graphical representation to the surface.

36 Claims, 3 Drawing Sheets

METHOD AND SYSTEM FOR MARKING SURFACE DEVIATIONS ON A THREE DIMENSIONAL SURFACE

BACKGROUND OF THE INVENTION

This invention relates to quality control of manufactured parts and, more particularly, to a method of automatically marking parts to facilitate inspection and rework of the part.

Quality control of manufacturing processes involving the machining of parts typically requires that some percentage of each batch of parts be pulled and inspected for nonconformity with design dimensions. Such inspection requires that actual part dimensions be measured for comparison with design tolerances. The number of measurements required depends on the complexity of the overall geometry of the part and of the particular surfaces involved. When the measurements indicate that a portion of a machined surface is out-of-tolerance on one or more of the inspected parts, a decision must be made whether to pass, rework or scrap the out-of-tolerance part(s). Moreover, a decision must be made regarding the parts of the batch that have not been inspected. Specifically, the operator must make a determination as to whether some or all of the non-inspected parts are likely to exhibit the out-of-tolerance condition. This can result in an entire batch being scrapped or unnecessarily reworked.

To add to the problem, the inspection/decision process must be repeated for each machining operation required to manufacture a part. Thus, if the procedure requires that 5% of the parts be inspected after each manufacturing process, a batch of 100 parts requiring five machining operations to produce will require 25 time-consuming inspections.

This approach is not only costly, it leaves the potential for discrepant parts to make it through the process undetected. The only way to avoid this problem and to make six sigma quality possible is to inspect every part. Using current methodologies this approach is entirely impractical

SUMMARY OF THE INVENTION

An embodiment of the present invention provides a method of marking on a surface of a part a graphical representation of deviations of the surface of the part from a design standard for the surface. The method comprises determining a point deviation for each of a plurality of points on the surface. The method further comprises determining deviation regions for the surface. Each deviation region includes only surface points having point deviations within a predefined deviation range associated with the deviation region. The method also comprises preparing a graphical representation of the surface illustrating the deviation regions and applying a copy of the graphical representation to the surface.

The step of determining point deviations in a method according to the present invention may include determining a measured point position relative to a fixed reference frame for each of the plurality of points. The step may further include determining from the design standard an expected point position relative to the fixed reference frame for each of the plurality of points and calculating the point deviation for each of the plurality of points using the measured point position and the expected point position. The step of determining a measured point position relative to a fixed reference frame may include positioning the part in a fixture at a predetermined orientation. This step may further include capturing at least one digital image of the surface and processing the at least one digital image in a data processor to determine the measured point positions of the plurality of points.

The steps of determining an expected point position, calculating a point deviation for each point, determining deviations regions for the surface, and preparing a graphical representation in a method according to the present invention may be carried out by a data processor. The method may further comprise displaying the graphical representation on a graphical user interface.

Another aspect of the invention provides a method of marking on a surface of a part a graphical representation of deviations of the surface from a design standard for the surface. The method comprises positioning the part in a fixture at a predetermined orientation, capturing at least one digital image of the surface, and downloading the at least one digital image to an automatic data processing system. The method further comprises processing information from the at least one digital image to determine a measured point position for each of a plurality of points on the surface. The method also comprises determining from the design standard an expected point position relative to the fixed reference frame for each of the plurality of points. A point deviation is calculated for each of the plurality of points using the measured point position and the expected point position. The method still further comprises determining deviation regions for the surface, each deviation region including only surface points having point deviations within a predefined deviation range associated with the deviation region. The method also comprises displaying a graphical representation of the surface illustrating the deviation regions on a graphical user interface and applying a copy of the graphical representation to the part surface.

The deviation regions determined in methods according to the present invention may be assigned a unique color for use in illustrating the deviation region in the graphical representation of the surface. The step of applying a copy of the graphical representation to the machine surface may include painting on the surface a representation of each deviation region using the color assigned to the deviation region.

Methods according to the present invention may further comprise identifying deviation regions that include points with deviations that exceed predetermined tolerance criteria. The methods may further include reworking the surface in response to identification of deviation regions that include points with deviations exceeding the predetermined tolerance criteria. The copy of the graphical representation applied to the surface may be used as a guide for reworking the surface.

One aspect of the present invention provides an inspection system for inspecting and marking a surface of a part. The system comprises a measurement station having means for obtaining spatial position data relative to a fixed reference frame for each of a plurality of points on the surface. The system further comprises a data processing system in communication with the means for obtaining spatial position data. The data processing system has means for receiving the spatial position data and for determining a point deviation from a surface standard point for each of at least a portion of the plurality of surface points. The data processing system also has means for preparing a graphical representation of a deviation map of the surface. The system further comprises a marking station having means for marking a copy of the graphical representation on the surface of the part. The means for marking is in communication with the data processing system.

Another aspect of the invention provides an inspection system for inspecting and marking a surface of a part. The system comprises a measurement station including a measuring system configured to obtain spatial position data relative to a fixed reference frame for each of a plurality of points on the surface. The system further comprises a data processing system in communication with the measuring system. The data processing system includes a mapping module programmed to use the spatial position data to form a three-dimensional map of the surface. The data processing system also include a deviation determination module programmed to determine a point deviation for each of at least a portion of the plurality of surface points. The data processing system also includes a deviation map module programmed to construct a graphical representation of a deviation map of the surface. The inspection system further comprises a marking station including an image transfer system in communication with the data processing system. The image transfer system is configured to mark a copy of the graphical representation on the surface of the part.

Yet another aspect of the invention provides an inspection system for inspecting and marking a surface of a part. The system comprises a measurement station including a measurement system configured to obtain spatial position data relative to a fixed-reference frame for each of a plurality of points on the surface. The system further comprises a data processing system in communication with the measuring system. The data processing system includes a mapping module programmed to use the spatial position data to form a three-dimensional map of the surface. The data processing system further includes a deviation determination module programmed to determine a point deviation for each of at least a portion of the plurality of surface points. The data processing system still further includes a deviation map module programmed to construct a graphical representation of a deviation map of the surface. The data processing system also includes a graphical user interface for selected display of the graphical representation. The inspection system also comprises a marking station include an image transfer system in communication with the data processing system. The image transfer system includes a printing arrangement having a remotely controllable printing applicator. The printing arrangement is configured for application of the graphical representation to the surface.

Still another aspect of the invention provides an inspection system for inspecting and marking a surface of a part. The system comprises a fixture configured to secure the part in a predetermined orientation with respect to a fixed reference frame and an optical-based meteorology arrangement having at least one digital imaging device. The digital imaging device is configured to obtained at least one digital image of the surface of the part for use in obtaining spatial position data relative to the fixed reference frame for each of a plurality of points on the surface. The inspection system also comprises a data processing system in communication with the at least one digital imaging device. The data processing system includes a mapping module programmed to use the at least one digital image to determine spatial position data for each of the plurality of points on the surface and to form a three-dimensional map of the surface. The data processing system also includes a deviation determination module programmed to determine a point deviation for each of at least a portion of the plurality of surface points. The data processing further includes a deviation map module programmed to construct a deviation map, including a set of deviation regions for the surface. The deviation map module is also programmed to construct a graphical representation of the deviation map. The data processing system still further includes a graphical user interface for selective display of the graphical representation. The inspection system further comprises a marking station including an image transfer system in communication with the data processing system. The image transfer system may include a printing arrangement having a remotely controllable printing applicator. The printing arrangement may be configured for application of the graphical representation to the surface.

Other objects and advantages of the invention will be apparent to one of ordinary skill in the art upon reviewing the detailed description of the invention.

DETAILED DESCRIPTION OF THE PREFERRED EMBODIMENT

The present invention provides a system and method of inspecting and evaluating a newly manufactured, remanufactured or worn part. The method includes creating a multidimensional map of deviations of part geometry from a desired standard and then marking the surface of the part with a copy of the map. The deviation map is a composite of a series of regions depicting areas of the part that differ from the standard by predetermined amounts. The map is marked on the surface of the part in such a way as to make out-of-tolerance areas readily apparent on visual inspection. The markings also provide assistance in reworking the part to conform to prescribed tolerances.

Figure 1:
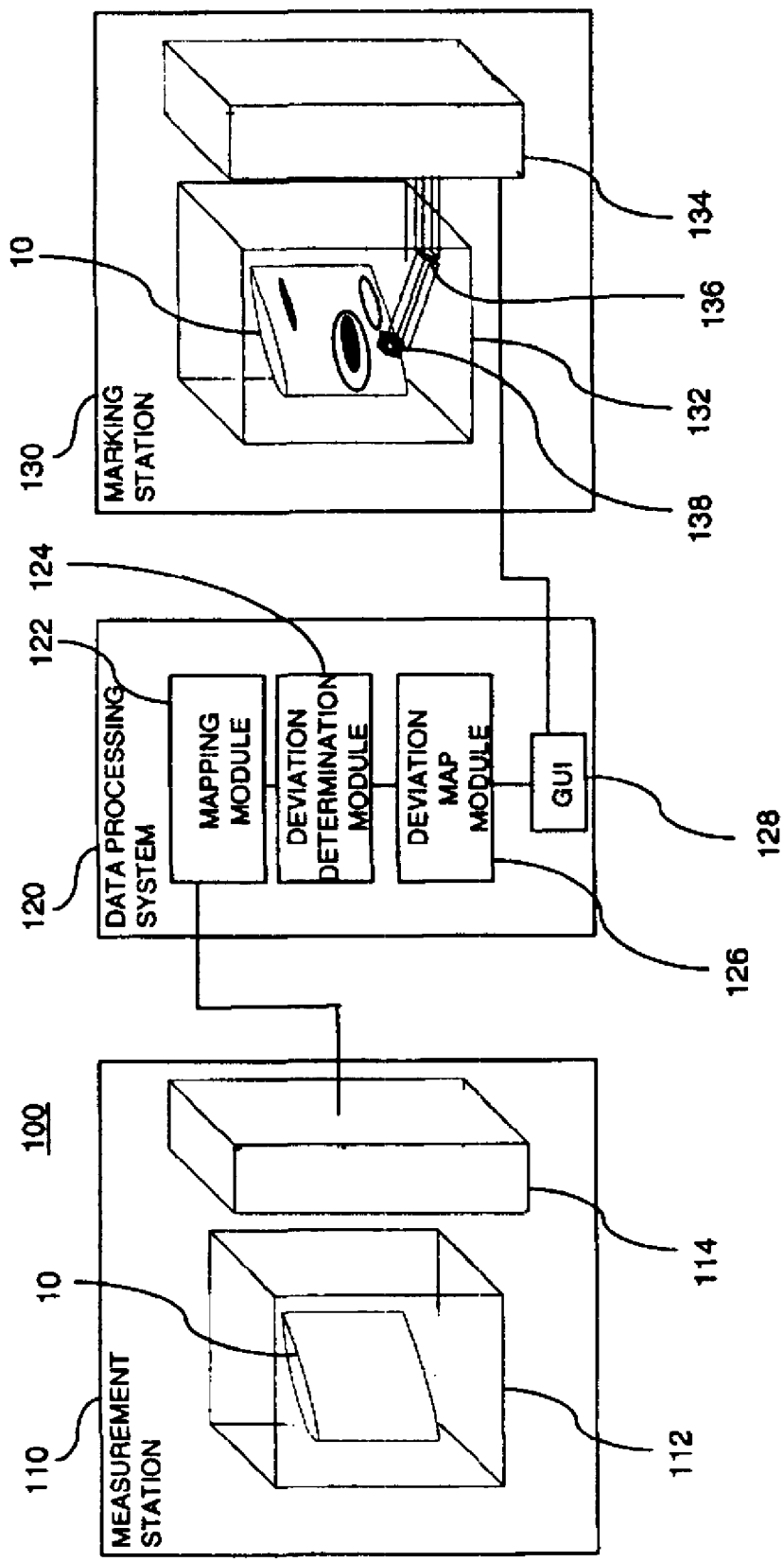
FIG. 1 is a schematic illustration of an inspection system according to an embodiment of the invention.

FIG. 1 illustrates an inspection system 100 according to the present invention that includes a measurement station 110 for obtaining the actual geometry of a part, a data processing system 120 for comparing the measured geometry of the part to a standard and for generating the deviation map, and a marking station 130 where the part is marked with a graphical representation 200 of the deviation map.

As parts are manufactured, they are passed to the measurement station 110 where sufficient measurements of each part are taken to allow a three dimensional model of the part to be constructed. This model may be a complete model of the part or a model of a particular surface of the part. In either instance, the measurements should be taken relative to a fixed reference frame that is the same for each part. In order to accomplish this, the measurement station 110 of the system 100 may include a high precision fixture 112 configured to hold the part in a particular orientation with respect to the fixed reference frame as measurements are taken.

It will be understood by those of ordinary skill in the art that the higher the number of measurements obtained, the greater the accuracy of the model of the part or surface of the part. Accordingly, the present invention contemplates the use of optical-based meteorology to obtain measurements for use in modeling the part. As shown in FIG. 1, the measurement station 110 may include a digital imaging device 114 that can be used to scan one or more surfaces of the part. The digital imaging device 114 can nearly instantaneously capture a series of two dimensional images of a surface that can then be transmitted to the data processor 120 where they are processed to provide a three dimensional map of the surface. An advantage of optical-based meteorology is that it can provide in a matter of seconds a surface map based on thousands of measurement points. It also provides the advantage that measurements can be taken without physical contact with the part. An exemplary digital imaging/optical-based meteorology system that can be used in the present invention is the Optigo™ 100 system of CogniTens 3D Vision Systems Ltd. Other meteorology systems may also be used.

It will be understood by those having ordinary skill in the art that other measurement system methodologies may be used to obtain surface measurements from which a three dimensional map may be derived. These may include laser-based point determination methods, automated mechanical measurement using coordinate measuring machines (CMMs) and simple hand measurement. None of these methods, however, provides the speed and relative precision obtained through the use of optical-meteorology.

The data processing system 120 of the inspection system 100 includes a three dimensional mapping module 122, a deviation determination module 124, a deviation map module 126 and a graphical user interface (GUI) 128. It will be understood that the various modules of the data processing system 120 may be integrated in a single data processor or may be incorporated into a plurality of data processors interconnected via a network.

The three dimensional mapping module 122 of the data processing system 120 receives the measurement data from the measurement station 110 and converts it to a three dimensional map of the part or surface. When the measurement data consist of two dimensional digital images, the mapping module 122 uses a series of algorithms to convert the two dimensional images to a three dimensional digital description of the part or surface. This description is the equivalent of a map based on thousands of individual measurement data points. If the measurement data comprise a relatively small number of points—such as, for example, would be obtained through mechanical or hand measurement—the three dimensional description may consist only of the measurement points. Alternatively, the mapping module 122 may use interpolation algorithms to construct a complete mathematical description of the part or surface.

The output of the mapping module 122 is a three dimensional map of the part or surface relative to the fixed reference frame. The map may consist of a tabulation of specific points or a mathematical model or group of models.

It will be understood that the three dimensional mapping module 122 may be an integral part of the optical meteorology system used to measure the part.

The deviation determination module 124 receives the three dimensional map of the part from the mapping module 122 and uses it to calculate deviations from a standard part description. The standard part description is typically a three dimensional map of a part or surface having zero dimensional deviation from a desired ideal part or surface. The format of this three dimensional map is configured to correspond to the format of the three dimensional map constructed from part measurements by the mapping module 122. This allows for a direct comparison of the two maps to determine areas where the measured part deviates from the standard.

The standard part map may be generated based on computer aided design (CAD) files or measurements of the geometry of a master part. Master part measurements can be made using the measurement station 110 of the inspection system 100. Other methods may also be used. Regardless of its basis, the standard part map should be constructed relative to the same fixed reference frame as the measured part map.

Using the standard part map, the deviation determination module 124 may calculate an expected position for each point of interest on the measured part or surface. A point deviation may be computed for each such point by calculating the difference between the measured point position and the expected point position along a line parallel to a predetermined axis. The expected point position divides the line into two half-lines. A positive deviation indicates that the measured point is on one half-line while a negative deviation indicates that the measured point is on the other half-line. A zero deviation indicates that the measured position of the point coincides with the expected position of the point.

Other methods of determining point deviations may also be used by the deviation determination module based on the measured and standard part maps. Point deviations may be determined for all measurement points, a subset of the measurement points or, using mathematical models, interpolated points.

The output of the deviation determination module 124 may be an array of point coordinates and associated deviations. Alternatively, the output may be a mathematical description of deviation versus point coordinate. The deviation map module 126 uses the output of the deviation determination module 124 to construct a graphical representation of the deviations of the part or surface. This graphical representation is a depiction of the three dimensional part or surface with the deviations illustrated as discrete regions or bands. These deviation regions will typically be distinguished based on color or shading, with each region having a unique color or shading pattern.

Each deviation region represents the areas of the part or surface that include measured points having point deviations in a predetermined range. The deviation map module 126 may be programmed to establish boundaries around areas falling within these ranges. For example, deviation ranges could be defined based on 0.1 mil intervals, starting with a first interval bounding 0.0. In such a case, all points having a deviation greater than or equal to +0.15 mil but less than +0.25 mils would fall within the same deviation range. The deviation map module 126 may establish boundaries around the areas of the surface including these points and assign the appropriate color or shading.

Figure 2:
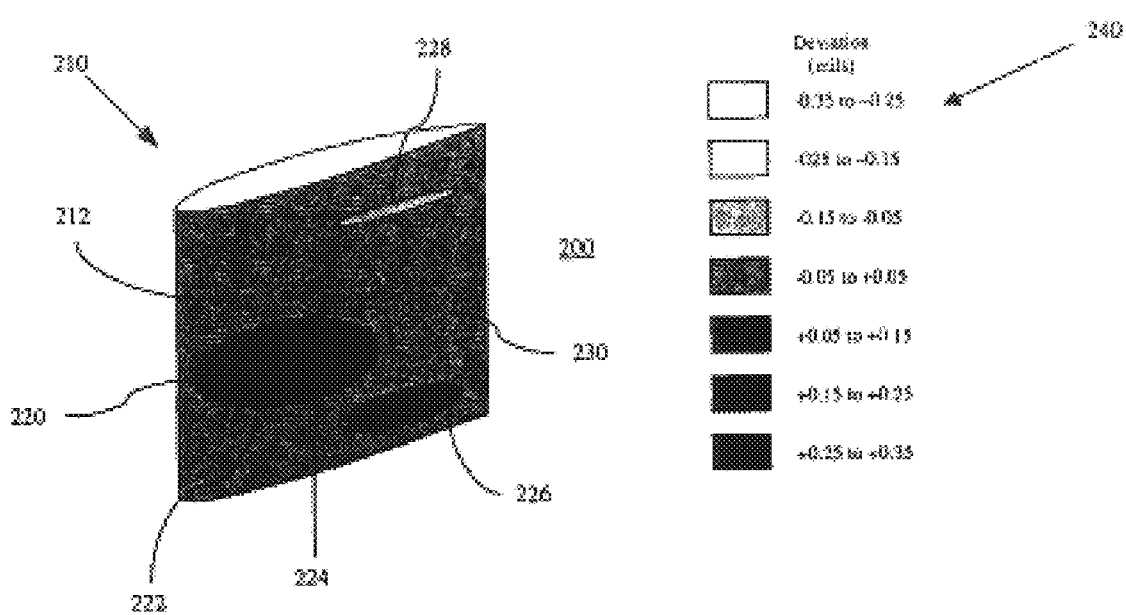
FIG. 2 is an illustration of a graphical user interface view of a graphical representation produced according to a method of the present invention.

The graphical representation 200 may be viewed by an operator using the GUI 128. Alternatively or in addition, the graphical representation 200 may be sent to a printer to provide a hard copy. An example of how a graphical representation may be presented on a GUI screen is shown in FIG. 1. FIG. 2 shows a graphical representation 200 of an airfoil portion 210 of a turbine blade and an accompanying scale 240. The representation 200 includes a deviation map 212 superimposed over the representation of a curved surface of the airfoil 210. The deviation map 212 depicts six separate areas 220, 222, 224, 226, 228, 230 that together cover the entire surface of interest. Each of these areas bounds only points having point deviations in one of the ranges shown in the accompanying scale 240. Each color in the scale 240 is assigned to a particular range of deviations and all of the areas of a particular color (in this case, the color is a shade of gray on a gray scale) in the deviation map 212 together constitute one deviation region.

A deviation region thus encompasses all of the measured points with point deviations in its associated range. For example, area 220 and area 226 are the same color and thus are both part of the deviation region including points with a deviation in the range from +0.05 mils to +0.15 mils. Area 222 is in the region including points with a deviation from +0.15 mils to +0.25 mils. Area 224 is in the region including points with a deviation from +0.25 mils to +0.35 mils. Area 228 is in the region including points with a deviation from −0.15 mils to −0.05 mils. The remainder of the surface area of the depicted airfoil surface is in area 230, which includes points with a deviation between −0.05 mils and +0.05 mils.

It should be apparent to one of ordinary skill in the art that the graphical representation 200 provides a simple visual tool that can be used to quickly determine areas of the depicted surface that are outside a predetermined tolerance level. For example, if the acceptable tolerance level is +0.05 mils, then the region comprising area 230 represents the in-tolerance portion of the surface. Areas 220, 222, 224 and 226 are out-of-tolerance on the positive side and area 228 is out of tolerance on the negative side. If a sign convention is adopted that makes a positive deviation indicative of excess material, areas 220, 222, 224, and 226 would require an additional operation such as sanding or machining to remove material and bring these areas into tolerance. Area 228, on the other hand, is an area of the surface that is depressed relative to the desired surface. In circumstances where it is possible to add material, area 228 might be brought into tolerance by doing so. Otherwise, a decision might be required as to whether to scrap the part.

The graphical representation 200 may be formed using gray scale colors to represent deviation regions as shown in FIG. 2. Alternatively, the graphical representation 200 may be formed using a spectrum of colors. In one aspect of the invention, a color scale may be used in which the color green or shades thereof may be used to represent areas falling within an acceptable tolerance range. Colors. toward the blue end of the spectrum could be used to represent negative deviations outside of the tolerance range and colors toward the red end of the spectrum could be used to represent positive deviations outside the tolerance range.

In another aspect of the system, the graphical representation 200 may depict area boundaries without shading or coloring. In this case, each such area would requiring marking with a symbol or label to indicate the deviation range of the area.

The marking station 130 includes a fixture 132 and a three dimensional image transfer system 134 that applies a copy of the graphical representation 200 to the actual surface of the measured part 10. The fixture 132 assures that the part 10 is held in position in an orientation relative to a fixed reference frame that corresponds to that of the earlier positioning of the part 10 for taking surface measurements. In one aspect of the invention, measurement fixture 112 and marking fixture 132 may be one and the same. In such a case, the part need not be moved during the inspection and marking process.

The image transfer system 134 may include an automatic or robotic system designed to paint or print a pattern on a complex three dimensional shape. A robotic system may include, for example, a sprayer or other applicator on a controllable arm that may be manipulated so as to follow the contours of the three dimensional graphical model of the part 10 as determined by the mapping module 122 and to apply a copy of the graphical representation 200 to the surface of the part 10.

It will be understood that the image transfer system 134 may include any automatic or robotic system designed to paint or print a pattern on a complex three dimensional shape. The image transfer system should be capable of reproducing the colors or shading patterns presented on the GUI. If color or shading patterns are not used, the image transfer system 134 must be capable of reproducing area boundary lines and appropriate symbols or labels. 421 One aspect of the invention provides a method of inspecting and evaluating a surface of a part. As used herein, the term part means any object having a surface that may be compared to a standard for that surface. Typically, a part will be a manufactured object for which inspection is desired during or immediately after manufacturing or after a period of usage. It will be understood that the part, the surface of interest or both may be produced using any manufacturing process including but not limited to casting, molding and machining. The surface of interest may also be produced by wear during usage. The method of inspecting and evaluating the surface may include the steps of determining point deviations of the surface from the standard surface, determining deviation regions for the surface, preparing a graphical representation of the deviation regions and applying Ha copy of the graphical representation to the surface of the part.

Figure 3:
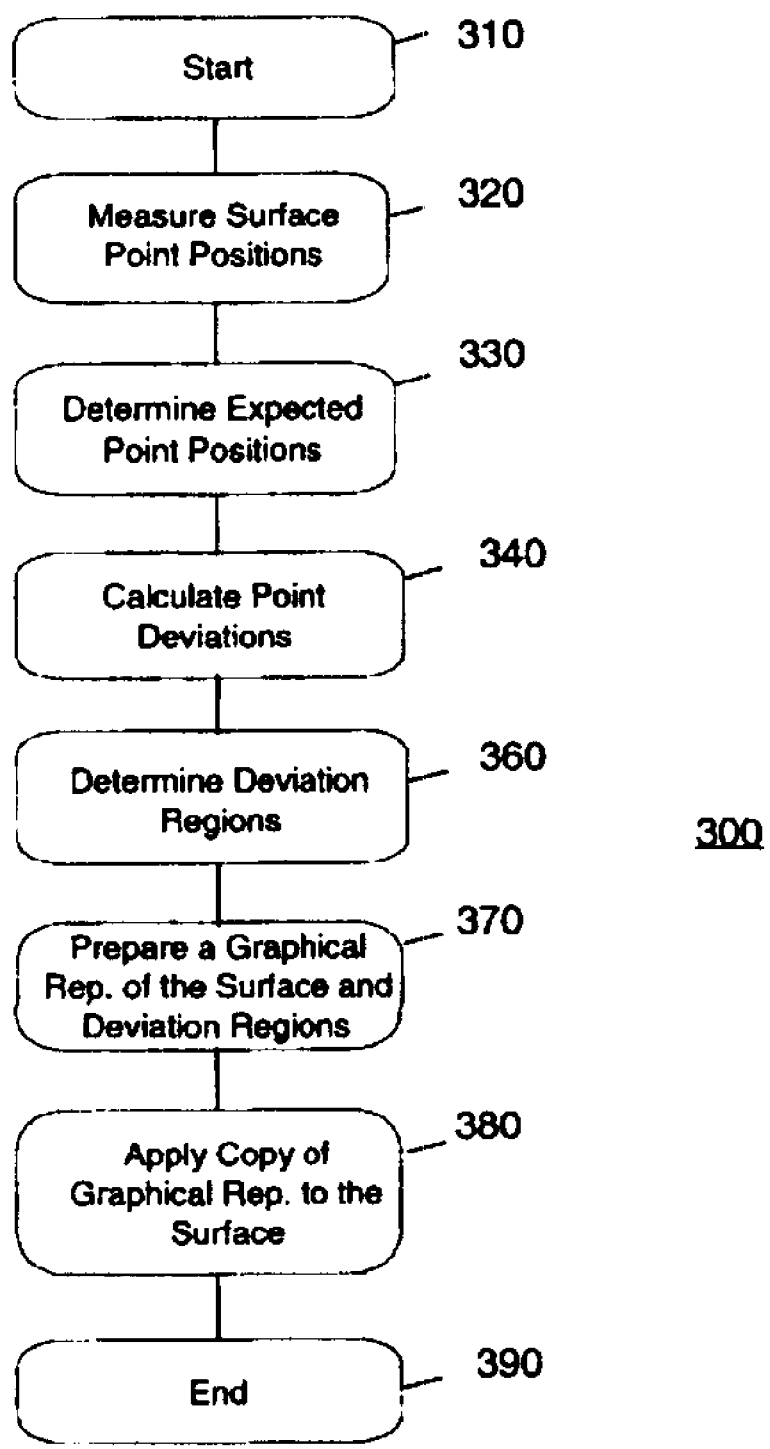
FIG. 3 is a flowchart illustrating steps performed by a method of marking a graphical representation of surface deviations on a surface of a part according to a method of the invention.

FIG. 3 illustrates the steps of a method 300 according to the present invention that utilizes the inspection system 100. The method 300 begins at step 310. At step 320, the measurement station 110 is used to measure the surface of the part. This may be accomplished by installing the part in the precision fixture and 112 and obtaining measurements using the digital imaging device 114 or other measurement system. The mapping module 122 may be used to convert the measurements to a three dimensional map of the surface. Measurement information, the three dimensional surface map or both may then be sent to the deviation determination module 124. At step 330, the deviation determination module 124 determines a set of expected point positions. These expected point positions may be determined for some or all of the measured surface points, a set of interpolated surface points or a combination of measured and interpolated points. At step 340, the deviation determination module 124 calculates point deviation values for the points used to determine expected point positions. These values represent the difference between the measured point position and the expected point position along a line parallel to a predetermined axis. At step 350, the deviation map module 126 uses the surface point map and the point deviations to determine the surface regions that include points having deviations falling within predetermined ranges. At step 360 a graphical representation of the surface is prepared. This graphical representation depicts the topology of the surface with the deviation regions illustrated using color bands, shading, or other graphical means as previously described. The graphical representation may be displayed to an operator using the GUI of the data processing system 120. The operator can quickly visually inspect the part by viewing the graphical representation. At step 370, a copy of the graphical representation is applied directly to the surface of the part at the marking station 130. This is accomplished by installing the part into the fixture 132 and using the marking system 134 to mark the part with the graphical representation. The method ends at step 380.

It will be understood that in certain variations of the method, it may be desirable to provide a decision gate after the graphical representation has been prepared but before it has been marked on the part surface. In particular, it may be desirable to allow a determination by an operator reviewing the graphical representation on the GUI that the part is entirely within tolerance and does not require marking.

Once marked on the part, the graphical representation provides easily viewed visual cues that can be used in further quality control procedures or in reworking the part. For example, once the airfoil part depicted in the graphical representation 200 of FIG. 2 has been marked, it will be immediately obvious to an inspector or machine operator how much material must be removed from areas 220, 222, 224 and 226 to bring the part into the −0.05 to +0.05 tolerance range. The relative extent of the negative deviation region 228 will also be obvious.

The inspection and marking method of the present invention can be carried out after any process step for all parts produced in a manufacturing line. After a part has been marked, it may be approved or sent back for rework. Reworked parts may be reinspected and remarked any number of times.

Other embodiments and uses of the invention will be apparent to those skilled in the art from consideration of the specification and practice of the invention disclosed herein. The specification and examples should be considered exemplary only. The scope of the invention is limited only by the claims appended hereto.

What is claimed is:

1. A method of marking on a surface of a part a graphical representation of deviations of the surface from a design standard for the surface, the method comprising:
    determining a point deviation for each of a plurality of points on the surface;
    determining deviation regions for the surface, each deviation region including only surface points having point deviations within a predefined deviation range associated with the deviation region;
    preparing a graphical representation of the surface illustrating the deviation regions; and
    applying a copy of the graphical representation to the surface.

2. A method according to claim 1 wherein the step of determining point deviations includes:
    determining a measured point position relative to a fixed reference frame for each of the plurality of points;
    determining from the design standard an expected point position relative to the fixed reference frame for each of the plurality of points; and
    calculating the point deviation for each of the plurality of points using the measured point position and the expected point position.

3. A method according to claim 2 wherein the step of determining a measured point position relative to a fixed reference frame includes
    positioning the part in a fixture at a predetermined orientation;
    capturing at least one digital image of the surface; and
    processing the at least one digital image in a data processor to determine the measured point positions of the plurality of points.

4. A method according to claim 2 wherein the steps of determining an expected point position, calculating a point deviation for each point, determining deviation regions for the surface, and preparing a graphical representation are carried out by a data processor and wherein the method further comprises:
    displaying the graphical representation on a graphical user interface.

5. A method according to claim 1 wherein each deviation region is assigned a unique color for use in illustrating the deviation region in the graphical representation of the surface.

6. A method according to claim 5 wherein the step of applying a copy of the graphical representation to the surface includes marking on the surface a representation of each deviation region using the color assigned to the deviation region.

7. A method according to claim 1 further comprising:
    identifying deviation regions that include points with deviations that exceed predetermined tolerance criteria.

8. A method according to claim 7 further comprising:
    reworking the surface in response to identification of deviation regions that include points with deviations exceeding the predetermined tolerance criteria.

9. A method according to claim 8 wherein the copy of the graphical representation applied to the surface is used as a guide for reworking the surface.

10. A method of marking on a surface of a part a graphical representation of deviations of the surface from a design standard for the surface, the method comprising:
    positioning the part in a fixture at a predetermined orientation;
    capturing at least one digital image of the surface;
    downloading the at least one digital image to an automatic data processing system;
    processing information from the at least one digital image to determine a measured point position for each of a plurality of points on the surface;
    determining from the design standard an expected point position relative to the fixed reference frame for each of the plurality of points;
    calculating a point deviation for each of the plurality of points using the measured point position and the expected point position;
    determining deviation regions for the surface, each deviation region including only surface points having point deviations within a predefined deviation range associated with the deviation region;
    displaying a graphical representation of the surface illustrating the deviation regions on a graphical user interface; and
    applying a copy of the graphical representation to the surface.

11. A method according to claim 10 wherein each deviation region is assigned a unique color for use in illustrating the deviation region in the graphical representation of the surface.

12. A method according to claim 11 wherein the step of applying a copy of the graphical representation to the surface includes marking on the surface a representation of each deviation region using the color assigned to the deviation region.

13. A method according to claim 10 further comprising:
    identifying deviation regions that include points with deviations that exceed predetermined tolerance criteria.

14. A method according to claim 13 further comprising:
    reworking the surface in response to identification of deviation regions that include points with deviations exceeding the predetermined tolerance criteria.

15. A method according to claim 14 wherein the copy of the graphical representation applied to the surface is used as a guide for reworking the surface.

16. An inspection system for inspecting and marking a surface of a part, the system comprising:

a measurement station having means for obtaining spatial position data relative to a fixed reference frame for each of a plurality of points on the surface;

a data processing system in communication with the means for obtaining spatial position data, the data processing system having means for receiving the spatial position data and for determining a point deviation from a surface standard point for each of at least a portion of the plurality of surface points and means for preparing a graphical representation of a deviation map of the surface; and a marking station having means for marking a copy of the graphical representation on the surface of the part, the means for marking being in communication with the data processing system.

17. A system according to claim 16 wherein the measurement station includes means for securing the part in a predetermined orientation with respect to the fixed reference frame.

18. A system according to claim 17 wherein the means for obtaining spatial position data includes an optical-based meteorology system having at least one digital imaging device configured for obtaining digital images of the surface.

19. A system according to claim 16 wherein the means for marking includes a printing arrangement having a remotely controllable printing applicator, the printing arrangement being configured for application of the graphical representation to the surface.

20. A system according to claim 16 wherein the means for preparing a graphical representation includes means for determining a set of deviation regions that can be depicted in the graphical representation, each deviation region including points having point deviations in a predetermined deviation range.

21. A system according to claim 20 wherein each deviation region is depicted in the graphical representation using a different color.

22. A system according to claim 16 wherein the data processing system includes a graphical user interface for selective display of the graphical representation.

23. An inspection system for inspecting and marking a surface of a part, the system comprising:

a measurement station including a measuring system configured to obtain spatial position data relative to a fixed reference frame for each of a plurality of points on the surface;

a data processing system in communication with the measuring system, the data processing system including a mapping module programmed to use the spatial position data to form a three dimensional map of the surface, a deviation determination module programmed to determine a point deviation for each of at least a portion of the plurality of surface points, and a deviation map module programmed to construct a graphical representation of a deviation map of the surface; and a marking station including an image transfer system in communication with the data processing system, the image transfer system being configured to mark a copy of the graphical representation on the surface of the part.

24. A system according to claim 23 wherein the measurement station includes a fixture configured to secure the part in a predetermined orientation with respect to the fixed reference frame.

25. A system according to claim 24 wherein the spatial position data includes at least one digital image of the surface and wherein the measuring system includes an optical-based meteorology arrangement having at least one digital imaging device configured to obtain the at least one digital image of the surface.

26. A system according to claim 23 wherein the image transfer system includes a printing arrangement having a remotely controllable printing applicator, the printing arrangement being configured for application of the graphical representation to the surface.

27. A system according to claim 23 wherein the deviation map module is further programmed to determine a set of deviation regions that can be depicted in the graphical representation, each deviation region including points having point deviations in a predetermined deviation range.

28. A system according to claim 24 wherein each deviation region is depicted in the graphical representation using a different color.

29. A system according to claim 23 wherein the data processing system includes a graphical user interface for selective display of the graphical representation.

30. An inspection system for inspecting and marking a surface of a part, the system comprising:

a measurement station including a measuring system configured to obtain spatial position data relative to a fixed reference frame for each of a plurality of points on the surface;

a data processing system in communication with the measuring system, the data processing system including a mapping module programmed to use the spatial position data to form a three dimensional map of the surface, a deviation determination module programmed to determine a point deviation for each of at least a portion of the plurality of surface points, a deviation map module programmed to construct a graphical representation of a deviation map of the surface and a graphical user interface for selective display of the graphical representation; and a marking station including an image transfer system in communication with the data processing system, the image transfer system including a printing arrangement having a remotely controllable printing applicator, the printing arrangement being configured for application of the graphical representation to the surface.

31. A system according to claim 30 wherein the measurement station includes a fixture configured to secure the part in a predetermined orientation with respect to the fixed reference frame.

32. A system according to claim 31 wherein the spatial position data includes at least one digital image of the surface and wherein the measuring system includes an optical-based meteorology arrangement having at least one digital imaging device configured to obtain the at least one digital image of the surface.

33. A system according to claim 30 wherein the deviation map module is further programmed to determine a set of deviation regions that can be depicted in the graphical representation, each deviation region including points having point deviations in a predetermined deviation range.

34. A system according to claim 33 wherein each deviation region is depicted in the graphical representation using a different color.

35. An inspection system for inspecting and marking a surface of a part, the system comprising:
- a fixture configured to secure the part in a predetermined orientation with respect to a fixed reference frame;
- an optical-based meteorology arrangement having at least one digital imaging device configured to obtain at least one digital image of the surface of the part for use in obtaining spatial position data relative to the fixed reference frame for each of a plurality of points on the surface;
- a data processing system in communication with at least one digital imaging device, the data processing system including
  - a mapping module programmed to use the at least one digital image to determine spatial position data for each of the plurality of points on the surface and to form a three dimensional map of the surface,
  - a deviation determination module programmed to determine a point deviation for each of at least a portion of the plurality of surface points,
  - a deviation map module programmed to construct a deviation map including
    - a set of deviation regions for the surface and to construct a graphical representation of the deviation map and
    - a graphical user interface for selective display of the graphical representation; and
- a marking station including an image transfer system in communication with the data processing system, the image transfer system including a printing arrangement having a remotely controllable printing applicator, the printing arrangement being configured for application of the graphical representation to the surface.

36. A system according to claim 35 wherein each deviation region is depicted in the graphical representation using a different color.

* * * * *